United States Patent
Ruth, II et al.

(10) Patent No.: US 7,175,938 B2
(45) Date of Patent: Feb. 13, 2007

(54) BATTERY CASE EMPLOYING RING SANDWICH

(75) Inventors: Douglas Alan Ruth, II, Pleasant Grove, UT (US); Hisashi Tsukamoto, Saugus, CA (US); Clay Kishiyama, Burbank, CA (US); Andrew Szyszkowski, Canyon Country, CA (US)

(73) Assignee: Quallion LLC, Sylmar, CA (US)

( * ) Notice: Subject to any disclaimer, the term of this patent is extended or adjusted under 35 U.S.C. 154(b) by 479 days.

(21) Appl. No.: 10/430,101

(22) Filed: May 5, 2003

(65) Prior Publication Data

US 2003/0211386 A1    Nov. 13, 2003

Related U.S. Application Data

(62) Division of application No. 09/774,450, filed on Jan. 30, 2001, now Pat. No. 6,607,843.

(51) Int. Cl.
  *H01M 2/02* (2006.01)
  *H01M 2/08* (2006.01)
  *B23K 31/02* (2006.01)

(52) U.S. Cl. ............ 429/164; 429/174; 429/181; 429/185; 429/175; 228/124.6; 428/621

(58) Field of Classification Search ............ 429/164, 429/174, 181, 185, 176, 178; 428/621, 632, 428/661, 469, 697; 228/124.6, 122.1; 156/272.8
See application file for complete search history.

(56) References Cited

U.S. PATENT DOCUMENTS

| | | |
|---|---|---|
| 2,572,071 A | 10/1951 | St. Clair et al. |
| 2,582,973 A | 1/1952 | Ellis |
| 2,585,922 A | 2/1952 | Ellis |
| 2,768,229 A | 10/1956 | Herbert |
| 3,791,868 A | 2/1974 | Compton et al. |
| 3,826,685 A | 7/1974 | Dubin et al. |
| 3,898,054 A * | 8/1975 | Purdy et al. ............... 428/656 |
| 3,985,576 A | 10/1976 | Lingscheit et al. |
| 4,053,687 A | 10/1977 | Coibion et al. |
| 4,158,721 A | 6/1979 | Decker et al. |
| 4,167,413 A | 9/1979 | Christ et al. |
| 4,170,694 A | 10/1979 | Chase et al. |
| 4,180,700 A | 12/1979 | Kraska et al. |

(Continued)

FOREIGN PATENT DOCUMENTS

EP    0 235 504 A1    9/1987

(Continued)

*Primary Examiner*—Raymond Alejandro
(74) *Attorney, Agent, or Firm*—Gavrilovich Dodd & Lindsey

(57) ABSTRACT

The invention includes a brazed ceramic ring that separates the positive and negative ends of the battery while still providing a leak-tight seal. The ceramic is aluminum oxide or zirconium oxide or zirconium oxide with 3% yttrium. The invention includes a brazing material, which is grater than 50% gold. The invention includes a titanium alloy case (Ti-6Al-4V) which is titanium with 6% aluminum and 4% vanadium as its major alloying elements. The case has the desirable properties of titanium such as high strength for a relatively low weight; and the case has the requisite ability and electro-activity to be used as a positive current carrying element where the battery's positive electrode exhibits more then 3.5 V vs. $Li/Li^+$.

14 Claims, 2 Drawing Sheets

Exploded View of Battery

U.S. PATENT DOCUMENTS

| | | |
|---|---|---|
| 4,215,466 A | 8/1980 | Bindin |
| 4,217,137 A | 8/1980 | Kraska et al. |
| 4,234,668 A | 11/1980 | Park et al. |
| 4,288,843 A | 9/1981 | Schroeder |
| 4,294,897 A | 10/1981 | Bindin |
| 4,375,127 A | 3/1983 | Elkins et al. |
| 4,722,137 A | 2/1988 | Ellenberger |
| 4,940,858 A | 7/1990 | Taylor et al. |
| 5,053,294 A | 10/1991 | Sernka et al. |
| 5,134,044 A | 7/1992 | Megerle |
| 5,194,337 A | 3/1993 | Yoshida et al. |
| 5,279,909 A | 1/1994 | Horner et al. |
| 5,320,915 A | 6/1994 | Ali et al. |
| RE34,819 E | 1/1995 | Mizuhara |
| 5,411,818 A | 5/1995 | Barlow et al. |
| 5,427,268 A * | 6/1995 | Downing et al. ............ 220/581 |
| 5,578,394 A | 11/1996 | Oweis et al. |
| 5,789,068 A | 8/1998 | King et al. |
| 6,040,086 A | 3/2000 | Yoshida et al. |
| 6,042,625 A | 3/2000 | Daio et al. |
| 6,114,059 A | 9/2000 | Watanabe et al. |
| 6,139,986 A | 10/2000 | Kurokawa et al. |
| 6,143,439 A * | 11/2000 | Yoppolo et al. ............... 429/91 |
| 6,197,074 B1 | 3/2001 | Satou et al. |
| 6,219,224 B1 | 4/2001 | Honda |
| 6,245,457 B1 | 6/2001 | Romero |
| 6,245,464 B1 | 6/2001 | Spillman et al. |
| 6,258,485 B1 | 7/2001 | Kitoh |
| 6,280,873 B1 | 8/2001 | Tsukamoto |
| 6,319,628 B1 | 11/2001 | Zama |
| 6,335,117 B1 | 1/2002 | Yoshida et al. |
| 6,379,840 B2 | 4/2002 | Kitoh et al. |
| 6,521,350 B2 | 2/2003 | Fey et al. |
| 6,617,514 B1 * | 9/2003 | Ushikoshi et al. ......... 174/84 R |
| 2001/0046625 A1 | 11/2001 | Ruth II, et al. |
| 2001/0053476 A1 | 12/2001 | Ruth et al. |
| 2002/0142216 A1 | 10/2002 | Skoumpris |
| 2003/0203279 A1 * | 10/2003 | Tsukamoto et al. ......... 429/176 |

FOREIGN PATENT DOCUMENTS

| | | |
|---|---|---|
| JP | 59-012557 | 1/1984 |
| JP | 01073750 A2 | 3/1989 |
| JP | 1239958 A2 | 9/1989 |
| JP | 01253941 A2 | 10/1989 |
| JP | 05-060241 | 3/1993 |
| JP | 10-012270 | 1/1998 |
| JP | 11186423 A2 | 7/1999 |
| JP | 2000-058033 A2 | 2/2000 |
| JP | 2000068396 A2 | 3/2000 |

* cited by examiner

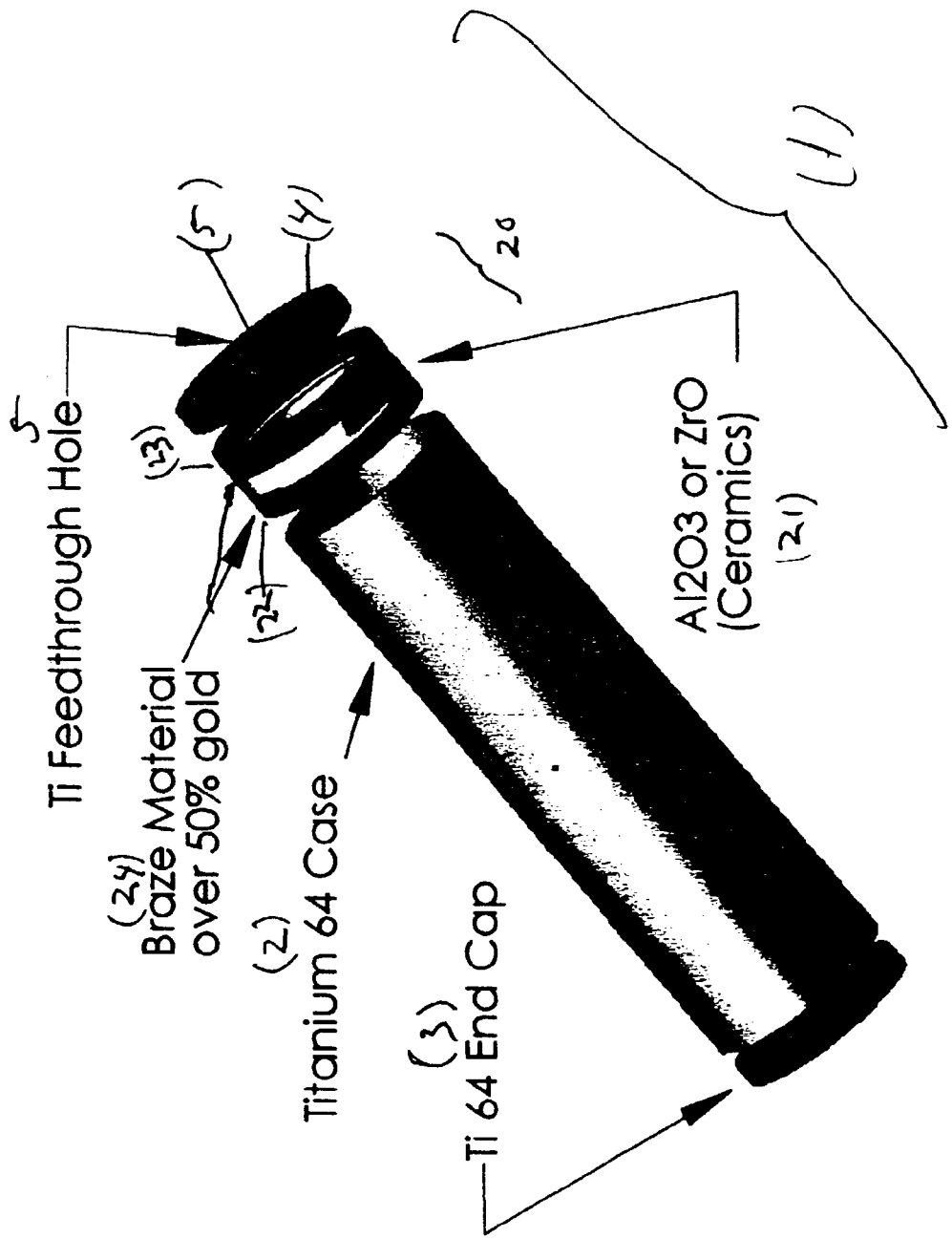
Figure 1. Exploded View of Battery

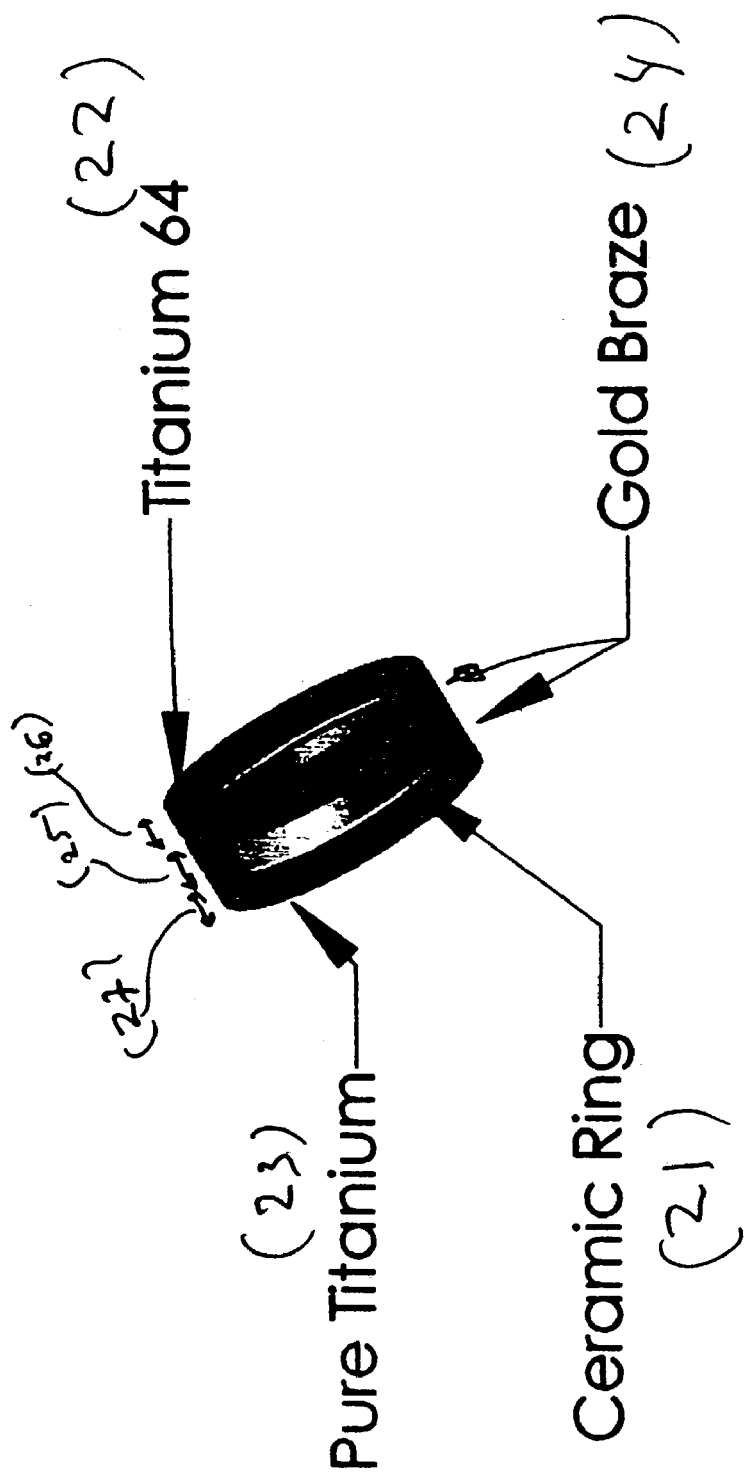
Figure 2. Ceramic Ring Sandwich

BATTERY CASE EMPLOYING RING SANDWICH

CROSS REFERENCE TO RELATED APPLICATION

This application is a Divisional of U.S. patent application Ser. No. 09/774,450, filed on Jan. 30, 2001 now U.S. Pat. No. 6,607,843, which is hereby incorporated by reference herein in its entirety.

FIELD OF THE INVENTION

This invention relates to brazed ceramic seals for use in lithium ion batteries.

BACKGROUND OF THE INVENTION

A chemical battery case may act to prevent the positive and negative output devices from coming into contact, i.e., shorting. The battery case in its entirety also functions to contain and prevent leakage of battery materials such as an electrolyte. Moreover, the battery case itself must provide for mechanical strength to contain pressures originating from within the battery as well as to provide the mechanical strength for ordinary handling of the battery.

SUMMARY OF THE INVENTION

The invention includes a brazed ceramic ring that separates the positive and negative ends of the battery while still providing a leak-tight seal. The ceramic is aluminum oxide or zirconium oxide or zirconium oxide with 3% yttrium. The invention includes a brazing material, which is grater than 50% gold. The invention includes a titanium alloy case (Ti-6Al-4V) which is titanium with 6% aluminum and 4% vanadium as its major alloying elements. The case has the desirable properties of titanium such as high strength for a relatively low weight; and the case has the requisite ability and electro-activity to be used as a positive current carrying element where the battery's positive electrode exhibits more then 3.5 V vs. Li/Li$^+$.

BRIEF DESCRIPTION OF THE DRAWINGS

The above and other features and advantages of the invention will be more apparent from the following detailed description wherein:

FIG. 1 shows the titanium alloy battery case with titanium and titanium alloy end caps and the ceramic non-conducting ring;

FIG. 2 shows the ceramic ring sandwich with the ceramic ring between a ring of Ti and a different ring of Ti-6Al-4V, and the gold-based braze.

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

The battery (1), as shown in FIG. 1, is constructed of a titanium alloy cylinder (2), the alloy being Ti-6Al-4V. This alloy is principally titanium with 6% aluminum and 4% vanadium, with oxygen, nitrogen, carbon, hydrogen, and iron typically present as trace elements. One end cap (3), which completes the bottom of the positive casing, is also of the titanium alloy Ti-6Al-4V. The ceramic ring sandwich (20) is shown in FIGS. 1 and 2. First looking at FIG. 2, the ceramic ring (21) is brazed by the gold alloy braze (24) to a ring of titanium (23) and to another ring of Ti-6Al-4V (22). The gold alloy braze (24) is one that contains more than 50% gold by weight. A specific type of gold alloy braze (24) is 96.4% gold, 3.0% nickel and 0.6% titanium. Some trace elements may be present with a corresponding slight adjustment in the composition percentages. The braze is chosen so that it can stand up to the electrochemical conditions inside the battery with which it will come in contact. The ceramic ring (21) is of aluminum oxide, zirconium oxides, or zirconium oxide with 3% yttrium.

Returning to FIG. 1, the ceramic ring sandwich (20) is placed on the open end of the titanium alloy cylinder (2) with the titanium alloy ring (22) toward the cylinder (2). The titanium alloy ring (22) is then laser welded to the titanium alloy cylinder (2). Subsequently a titanium end cap (4) with a feed-through hole (5) is laser welded to the titanium ring (23) of the ceramic ring sandwich (20).

In order to prevent any short-circuiting by way of the ceramic ring (21), it must be at least 10 μm in height (25). This arises from any diffusion of the gold alloy braze material (24) through the ceramic ring (21). Additionally, the height (27) of the titanium and the height (26) of the titanium alloy rings must be at least 30 μm. This is so that the gold alloy braze will not re-melt when the Ti and Ti-6Al-4V rings are laser welded.

Methods of assembly for the ceramic ring sandwich (20) include brazing together a sheet of ceramic material between a sheet of titanium and titanium alloy (Ti-6Al-4V) and then laser cutting a shape to fit the end of a given battery case. The sandwich can be cut into almost any desired geometrical shape. Another method is cutting out the ceramic ring (21) and the titanium alloy (Ti-6Al-4V) ring (22) and the titanium ring (23) separately and brazing the pieces together.

The titanium alloy (Ti-6Al-4V) cylinder (2) has the desirable properties of titanium, such as high strength for a relatively low weight; and the case has the requisite ability and electro-activity to be used as a positive current carrying element where a battery's positive electrode exhibits more than 3.5 V vs. Li/Li$^+$.

Typically, once the ceramic sandwich (20) is welded to the cylinder (2), the battery electrodes (not shown) can be inserted into the cylinder (2) and the feedthrough pin (not shown) inserted through the hole (5) in the lid end cap (4). The feedthrough pin (not shown) is welded shut to provide a leak-tight seal. The battery (1) is filled with electrolyte (not shown) and laser welded closed on the bottom end cap (3). Tabs (not shown), which are connected to the positive electrode (not shown), can be folded out of the case and laser welded at the same time as the bottom end cap (3).

While the invention herein disclosed has been described by means of specific embodiments and applications thereof, numerous modifications and variations could be made thereto by those skilled in the art without departing from the scope of the invention set forth in the claims.

What is claimed is:

1. A battery case, comprising:
   a cylinder configured to hold battery electrodes, the cylinder including titanium;
   a first end cap welded to the cylinder;
   a second end cap sealed to the cylinder using a brazed ceramic ring sandwich including;

a first ring including ceramic material;
a second ring including titanium attached to the first ring with a gold alloy braze;
a third ring including titanium attached to the first ring with the gold alloy braze; and
wherein the gold alloy braze has a gold content of more than 50 wt %; and
a weld attaches the third ring of the brazed ceramic ring sandwich to the cylinder; and wherein
the second ring of the brazed ceramic ring sandwich to the second end cap.

2. The battery case of claim 1, wherein the cylinder includes titanium with 6% aluminum and 4% vanadium.

3. The battery case of claim 1, wherein the first end cap includes titanium.

4. The battery case of claim 1, wherein the first end cap includes titanium with 6% aluminum and 4% vanadium.

5. The battery case of claim 1, wherein the second end cap includes titanium.

6. The battery case of claim 1, wherein the second end cap includes a feedthrough hole formed feedthrough.

7. The battery case of claim 1, wherein the third ring of the brazed ceramic ring sandwich is welded to the cylinder with a laser weld.

8. The battery case of claim 1, wherein the second ring of the brazed ceramic ring sandwich is welded to the second end cap with a laser weld.

9. The battery case of claim 1, wherein the ceramic material is selected from the group consisting of aluminum oxide, zirconium oxide, and zirconium oxide with 3% yttrium.

10. The battery case of claim 1, wherein the gold alloy braze includes 96.4% gold 3.0% nickel, and 0.6% titanium.

11. The battery case of claim 1, wherein the third ring includes titanium with 6% aluminum and 4% vanadium.

12. The battery case of claim 1, wherein a second weld attached the second ring of the brazed ceramic ring sandwich to the second end cap.

13. A battery case, comprising:
a cylinder configured to hold battery electrodes, the cylinder including Ti-6Al-4V;
a first end cap including titanium with 6% aluminum and 4% vanadium welded to the cylinder;
a second end cap including titanium sealed to the cylinder using a brazed ceramic ring sandwich, the brazed ceramic ring sandwich including:
a first ring including ceramic material;
a second ring including titanium attached to the first ring with a gold alloy braze; and
a third ring including Ti-6Al-4V attached to the first ring with the gold alloy braze; wherein
the gold alloy braze has a gold content of more than 50 wt %;
wherein a weld attaches the third ring of the brazed ceramic ring sandwich to the cylinder; and
wherein the second ring of the brazed ceramic ring sandwich is attached to the second end cap.

14. The battery case of claim 13, wherein a second weld attached the second ring of the brazed ceramic ring sandwich to the second end cap.

* * * * *